Dec. 2, 1969  O. FISCHER ET AL  3,481,261

FILM MAGAZINE AND CAMERA THEREFOR

Filed May 2, 1967  4 Sheets-Sheet 1

United States Patent Office 3,481,261
Patented Dec. 2, 1969

3,481,261
FILM MAGAZINE AND CAMERA THEREFOR
Oskar Fischer, Post Bremke uber Rinteln (Weser), and Horst Golombek, Braunschweig, Germany, assignors to Voigtlander, A.G., Braunschweig, Germany
Filed May 2, 1967, Ser. No. 635,546
Claims priority, application Germany, May 7, 1966, V 31,014
Int. Cl. G03b 19/04
U.S. Cl. 95—31                                    13 Claims

ABSTRACT OF THE DISCLOSURE

A film magazine capable of being introduced into and withdrawn from a camera. The magazine carries a source of electrical energy electrically connected with contacts at the exterior of the magazine. When the magazine is in the camera these contacts at the exterior of magazine respectively engage camera contacts which form part of a circuit which includes an electric motor for driving the film-transport means of the camera, so that in this way the source of electrical energy which is carried by the magazine itself is operatively connected with the camera motor for driving the latter through the electrical circuit which is in the camera. The source of electrical energy which is carried by the magazine has a magnitude of power which is at least sufficient to advance the film through the magazine until at least the last frame thereof is exposed. The camera carries structure coacting not only electrically with the source of electrical enrgy carried by the magazine but also with the film in the magazine for energizing the motor to advance the film after an exposure is made and until the next frame is in position for exposure. Also, the camera has a structure for preventing operation of the motor during actuation of the shutter of the camera and for closing the circuit of the motor after the shutter has been tripped to make an exposure, so that in this way the next frame is advanced in position for exposure. Also, the camera has a closure mechanism for opening and closing the camera so that when the camera is open a film magazine can be introduced into and withdrawn therefrom, and a switch is controlled by the camera closure mechanism for permitting the motor to be operated only when the camera is closed.

BACKGROUND OF THE INVENTION

The present invention relates to film magazines which carry film to be exposed in the camera and which are capable of being introduced into and removed from a camera.

Thus, the film magazine has a film supply chamber and a film take-up chamber as well as a rigid film-guide means extending between and communicating with these chambers for guiding film from the film supply chamber to the film take-up chamber. This film-guide means is formed with an imaging window through which the film is exposed.

Moreover, the present invention relates not only to a magazine of this latter type but also to a camera which is provided for use with the magazine.

The use of film magazines of the above general type as well as cameras designed to accommodate such film magazines makes it possible for the operator of the camera to avoid the manipulations which would otherwise be required in connection with introducing film into the camera and connecting the leading end of the film with a rotary film take-up spool which is built into the camera. Furthermore, the use of such magazine eliminates the requirement of rewinding the exposed film. Thus, conventional film magazines can be inserted into cameras designed to accept the same in such a way that the film-transporting mechanism of the camera becomes automatically coupled with the film in the magazine to advance the latter film. Thus, by actuating the film-transport means of the camera it is possible to wind a leading portion of the film strip on the film take-up spool, and then the film can be advanced in a stepwise manner for exposure of the successive film frames which become successivley located at the window of the magazine. After the final winding of a trailing portion of the film strip onto the take-up spool, the film magazine with the exposed film therein can be removed from the camera.

Although conventional cameras of this general type do simplify the operation of the camera in connection with the introduction and removal of film therefrom, nevertheless it is essential that the operator of the camera still carry out certain operations and direct his attention to the manner in which the camera is operated for the purpose of winding the exposed film as well as the leading and trailing film strip portions onto the take-up spool since manual operations are required to advance the film from one frame to the next as well as to wind the leading and trailing film strip portions onto the take-up spool.

There are conventional cameras which have built-in spring or electric motors by means of which the film-transport mechanism of the camera is driven after each exposure so as to advance the film through the increment required to situate the next unexposed frame in position for exposure. Thus, with cameras of this type, the manipulations in connection with advancing the film are eliminated, but the operator must still make sure that the spring motor is wound up sufficiently to have stored therein the energy required for advancing the film, so that the state of the spring motor must constantly be watched, whereas in the case of an electric motor the operator must see to it that the battery which supplies the motor with its energy is always in a condition where sufficient energy is available to assure proper camera operation and thus avoid possible sources of trouble during operation of the camera.

SUMMARY OF THE INVENTION

It is a primary object of the present invention to provide a camera of the above general type as well as a film magazine to be used therein, while avoiding all of the above drawbacks by making it unnecessary for the operator of the camera of the present invention to carry out manipulations and to check conditions of camera parts to the extent which is now required with conventional cameras of the above general type.

In particular, it is an object of the present invention to provide electrically driven cameras of the above general type with a construction which makes it completely unnecessary for the operator to be concerned with the battery.

Also, it is an object of the present invention to provide an electrically-operated camera of the above general type which only requires the operator to actuate the shutter in order to make an exposure, all other operations or checking of conditions of the camera parts, such as a battery thereof, being eliminated with the structure of the invention.

Furthermore, it is an object of the present invention to provide a camera of the above general type which prevents operation of an electrically driven film-transport means as long as the shutter-actuating mechanism is operated and which will bring about automatic advancing of an unexposed frame into position for exposure after the next-preceding frame has been exposed while preventing also movement of the next-following frame into position for exposure until the shutter has been actuated.

The objects of the present invention also include the provision of a camera which will prevent actuation of the film-transport mechanism until the camera has been securely closed with a film magazine therein.

An additional object of the invention is to provide a construction which will automatically wind a leading film portion onto the take-up spool of the film magazine after the latter has been initially introduced into the camera until the first frame is in position for exposure.

The objects of the present invention also include the provision of a camera which will reliably wind a trailing portion of the film strip, subsequent to the last frame thereof, past the exposure window of the magazine after the required number of frames have been exposed.

In addition, it is an object of the present invention to provide for an electric motor of a camera of the above type a circuit which will reliably stop the driving of the film-transport mechanism as soon as a film frame which has not yet been exposed is situated in a proper position.

In accordance with the invention the film magazine, which is of the above general type, carries its own source of electrical energy which may be located in the interior of the film magazine and which has its poles electrically connected with contact members situated at the exterior surface of the magazine.

Through this expedient of the present invention of locating the supply of current in the film magazine itself, this source of electrical energy supplying the electric motor of the camera with the power required to operate this motor, it is possible not only to save that space in the camera which would otherwise be required for the battery, but in addition those manipulations which would otherwise be required in connection with introduction of the source of electrical energy into the camera are eliminated. Thus, when the film is introduced into the camera of the invention, a source of electrical energy it at the same time introduced into the camera, and the magnitude of this source of electrical energy is sufficiently great to provide for the camera motor the power required to advance the film until it has been completely exposed.

Thus, with the structure of the present invention it is unnecessary for the operator to bother with checking of the condition of the supply of current, since a sufficient supply of power is reliably provided by way of the source of electrical energy carried by the magazine itself, this power being sufficient not only to advance the film but also to provide the energy required for other operations such as cocking the shutter. Therefore, with the structure of the invention there is no possible source of trouble in connection with advancing of the film where otherwise there would be such a source of trouble in connection with the battery which supplies energy to the motor. The operator need not be concerned with whether or not the battery is nearing its exhaustion point, and in fact with the structure of the invention the source of current which is carried by the magazine will become almost exhausted only when the entire film strip has been exposed and wound onto the take-up spool. At this latter time, however, the source of current as well as the film magazine are no longer in a condition for further use and they can both be disposed of after the magazine has been broken open to remove the exposed film at the plant where the development of the film takes place.

It is not required that the film magazine of the present invention have an outline or form which differs essentially from conventional film magazines if, according to one of the features of the invention, the source of current is situated in the interior of the magazine, preferably in the film supply chamber thereof, and particularly within the hollow space which is surrounded by the coil of unexposed film in the supply chamber. It is furthermore of advantage to situate the contact members at the exterior surface of the film supply chamber of the magazine, because in this way relatively short electrically conductive holding members can interconnect the exterior contacts with the poles of the electrical source of energy.

At the film-guiding means of the magazine, which interconnects the supply and take-up chambers thereof, an opening is provided to coact with a switch-actuating means which controls the energizing and stopping of the motor in connection with the advancing of the film frame-by-frame during making of the successive exposures. In addition, the magazine of the invention is provided with an opening at the film-guiding means to coact with a structure for automatically terminating the operation of the motor after all of the frames have been exposed and the trailing portion of the film has been wound on to the take-up spool. While the film-transport means is controlled by way of a switch-actuating means which coacts with the film perforations, one film perforation being provided for each frame which is to be exposed, the structure for terminating the motor operation when the trailing portion of the film has been advanced to the take-up spool coacts with an unperforated portion of the film strip.

The electric motor, which is carried by the camera for driving the film-transport mechanism, is connected into an electrical circuit which in turn is electrically connected with and includes camera contact members which respectively engage the contact members at the exterior surface of the film magazine of the invention. This circuit includes a switch which is closed to energize the motor and opened to stop the motor, and a switch-actuating means coacts with the row of perforations of the film to control this latter switch so as to start the motor after an exposure and stop the motor when the next film frame is in a position to be exposed. This switch-actuating means is in turn controlled by a shutter-actuating means which places the switch-actuating means in a position closing the switch only after the shutter has been tripped, this switch-actuating means itself coacting with a perforation of the film to stop the motor when the next frame is in a position to be exposed. As long as this latter switch-actuating means engages an unperforated portion of the film, the switch which is controlled by this switch-actuating means is closed to maintain the motor energized and operating. However, when this switch-actuating means enters into a perforation of the film, it will automatically control the switch to terminate the operation of the motor and thus terminate the advance of the film. Only when the shutter is again tripped is this switch-actuating means displaced to a position where the switch is closed to again energize the motor.

When the film magazine of the invention is introduced into the camera of the invention, the contacts of the magazine engage the contacts of the camera so that the source of current which is carried by the magazine becomes electrically connected with the motor which is carried by the camera. At the same time the switch-actuating means of the camera engages an unperforated portion of the film which is in the magazine, so that it assumes a position in which the circuit of the electric motor is closed, and the motor brings about rotation of the spool in the take-up chamber of the magazine through a suitable drive and motion-transmitting structure until the switch-actuating means enters into the first film perforation corresponding to the first frame of the film which is to be exposed and in this way actuates the switch to interrupt the circuit of the motor. When the shutter is tripped to make the first exposure, the switch-actuating means is displaced to a position out of the film perforation so as to again close the circuit of the motor, and a renewed film transportation takes place until the switch-actuating means is received in the next film perforation, thus terminating the film transport when the next frame is in a position to be exposed. Thus, the operator of the camera is in no way concerned with any particular manipulations in connection with advancing of the film and at the same time is assured that the source of current will reliably provide the energy required for operation of the motor and other camera mechanisms.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF A PREFERRED EMBODIMENT

Figure 1:
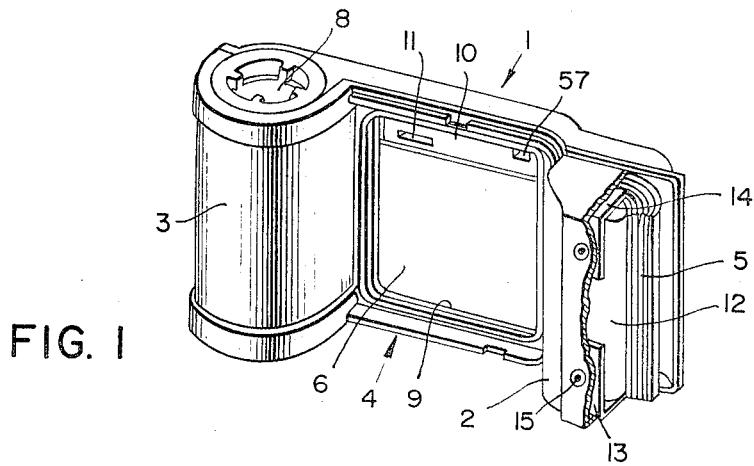
FIG. 1 is a perspective illustration of one possible film magazine according to the present invention, the magazine being shown partly broken away so as to more clearly illustrate the details thereof.

It is to be understood that while in the example described below and shown in the drawings the invention is disclosed in connection with a still camera, nevertheless the invention is equally applicable to a film magazine for motion picture film and to a motion picture camera to be used with such a film magazine.

Referring now to the drawings it will be seen that the film magazine 1 which is illustrated therein includes, as is particularly apparent from FIG. 1, a film supply chamber 2 and a film take-up chamber 3. In addition, the film magazine has a film-guide means 4 which extends between and communicates with the supply chamber 2 and the take-up chamber 3 so as to guide the film for movement from the chamber 2 into the chamber 3. Initially the roll of unexposed film 6 is situated in the supply chamber 2 in the form of a coil 5, while the leading portion of the film strip extends through a guide passage of the film-guide means 4 into the take-up chamber 3 onto the take-up spool 7 which is supported for rotary movement in the chamber 3. The take-up spool 7 is provided at its top end with a clutch of coupling portion 8 in the form of suitable teeth which coact with the teeth of a rotary film winding key of the camera, these teeth intermeshing with each other so that the turning of the camera film-winding mechanism will be transmitted to the spool 7.

The film-guide means 4 of the magazine is formed with an exposure window 9 through which a film frame positioned at the window is exposed when the shutter of the camera is actuated. The film-guide means has an elongated wall portion 10 which defines part of the window 9 and which is formed with an opening 11 through which a switch arm of a switch-actuating means described in further detail below extends to coact with the successive perforations arranged along a side edge portion of the film 6.

In accordance with the present invention a source of current is built into the film magazine 1. This source of current takes the form of an elongated battery 12 supported within the film supply chamber 2. In fact, this battery is located within the hollow space which is surrounded by the film supply coil 5. Instead of a single bar battery, a series of these batteries may be provided in the space surrounded by the coil 5. The two poles of the battery 12 are engaged by electrically conductive metal contact members 13 and 14 which serve as holders to support the battery 12 and which are fixed to the magazine at an inner surface of the chamber 2. These holders 13 and 14 in addition are connected with magazine contact members 15 and 16 situated at the exterior surface of the magazine, at the outer surface of the wall of the chamber 2 thereof, so that in this way the holders 13 and 14 serve not only to support the battery but also to electrically connect the poles thereof respectively with the magazine contact members 15 and 16. The magnitude of the energy which can be provided by the battery 12 is chosen in such a way that there will be sufficient energy to reliably drive the film-winding key which coacts with the clutch portion 8 of the film take-up spool 7 so as to wind the entire length of film 6 onto the take-up spool, this source of energy also being sufficiently great to drive all of the film-advancing mechanisms of the camera which are coupled to the spool 7, as well as to carry out further functions such as cocking the shutter, actuating a film counter, and the like.

FIGS. 2–6 illustrate by way of example a photographic camera 20 which is suitable for use with the magazine 1.

Figure 4:
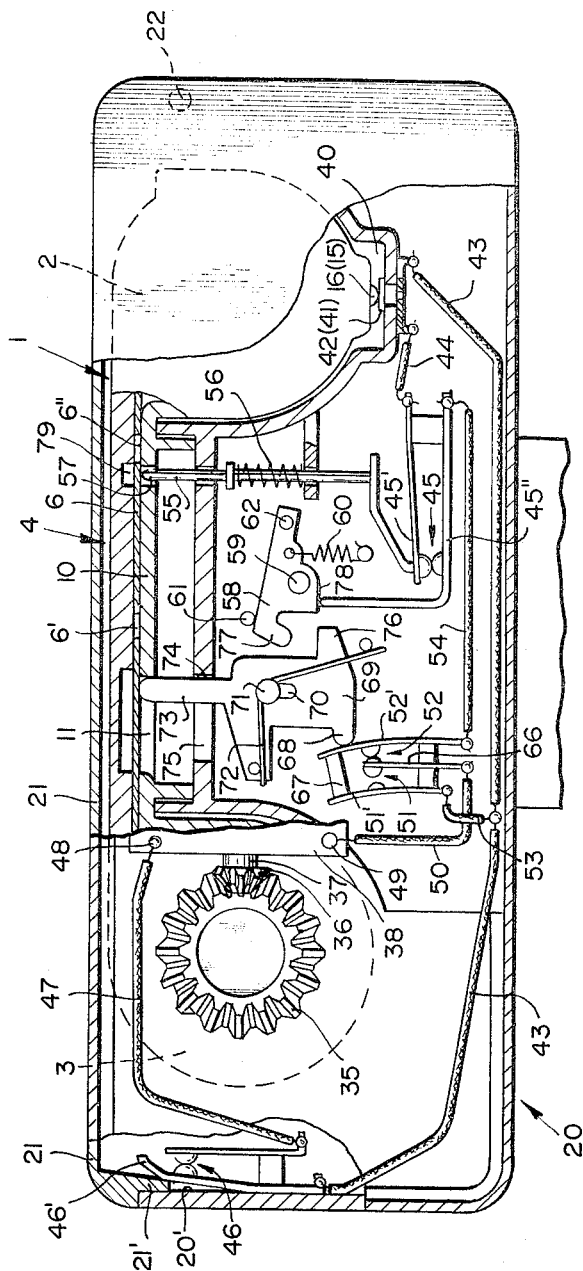
FIG. 4 is a sectional plan view showing the magazine in the camera and showing the structure of the camera which coacts with the structure of the magazine, the parts being shown in FIG. 4 in a position which they take during advancing of the leading portion of the film strip into the take-up chamber and before the first perforation of the film has reached a position where the first film frame corresponding thereto is in a position to be exposed.

This camera 20 has a magazine chamber the shape and size of which conform to the exterior configuration of the magazine 1, so that after a rear wall 21 of the camera housing is displaced to its open position, a magazine can be introduced into the camera. This rear wall 21 forms a closure means for the camera and is capable of turning about a hinge 22 (FIG. 4).

Figure 2:
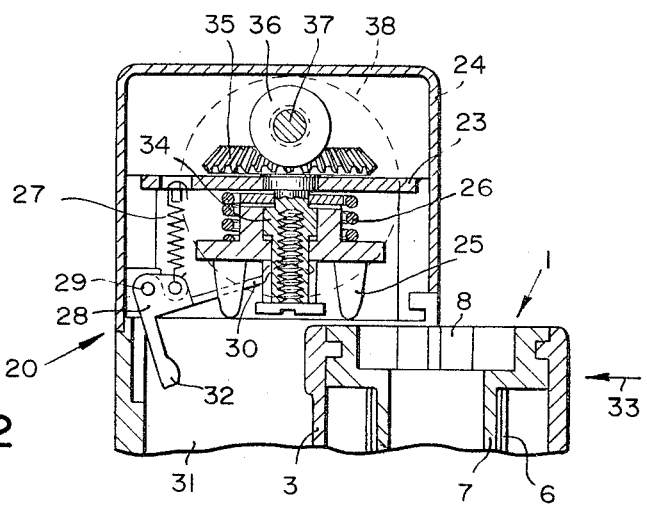
FIG. 2 is a fragmentary sectional elevation taken at the region of the take-up spool of the magazine and showing both the camera and the magazine of the present invention in an intermediatae condition during introduction of the magazine into the camera.
Figure 3:
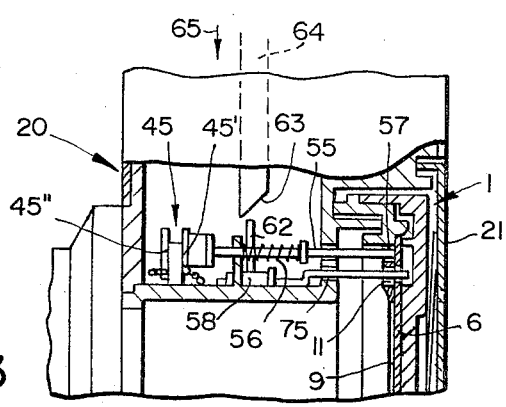
FIG. 3 is a fragmentary sectional elevation taken in the region of the exposure window of the camera and magazine and showing the magazine in the camera of the invention.

The camera has an intermediate wall 23, shown in FIG. 2, situated within an upper camera cap 24, and the rotary film-winding key 25 is supported for rotary movement by this intermediate wall 23, this key 25 having a toothed bottom end coacting with the teeth of the coupling or clutch portion 8 of the film take-up spool 7. The key 25 is acted upon by a compression spring 26 which seeks to displace the key 25 downwardly to a position where it is in driving engagement with the clutch portion 8 of the spool 7. However, the force of the spring 26 is opposed by the force of a tension spring 27 operatively connected with a two-armed lever 28 supported for turning movement by a stationary pivot 29. One arm 30 of the lever 28 engages the key 25 and holds it in its upper position shown in FIG. 2, as long as a magazine is not situated within the camera. In this way the key 25 is displaced out of the magazine chamber 31 of the camera. On the other hand, the arm 32 of the lever 28 extends into the interior of the magazine chamber 31 when there is no magazine in this chamber. When the magazine is introduced into the camera in the direction of the arrow 33 shown in FIG. 2, the magazine will itself engage the arm 32 and displace it forwardly, thus turning the lever 28 in a clockwise direction, as viewed in FIG. 2, in opposition to the spring 27, so that the spring 26 can expand and lower the key 25 to its position in operative engagement with the clutch portion 8 of the spool 7. The key 25 is supported for axial movement on a shaft 34 onto which the key is slidably keyed so that it cannot rotate with respect thereto but is only axially movable therealong, and this shaft 34 is coaxially fixed with a bevel gear 35 which meshes with a second bevel gear 36 which is coaxially fixed to a shaft 37 which extends into the housing of an electric motor 38. Within the housing of the electric motor 38 is also located a stepdown transmission which is driven by the motor and which in turn drives the shaft 37.

The electric motor 38 is provided with energy from the battery 12 of the magazine 1. For this purpose the camera carries a pair of camera contact members 41 and 42 in the form of suitable plates situated in the chamber 40 of the camera which receives the supply chamber of the magazine, and these camera contacts 41 and 42 are positioned so as to engage, respectively, the contacts 15 and 16 at the exterior of the supply chamber of the magazine when the latter is situated within the camera. Thus, the stationary camera contact plates 41 and 42 will respectively engage the magazine contacts 15 and 16 when the magazine is in the camera. The electrical circuit which interconnects the motor with the battery includes a lead or conductor 43 electrically connected with the contact plate 41 while the contact plate 42 is electrically connected with a conductor 44. The conductor 44 is in turn electrically connected with a switch 45, and in particular with a springy switch arm 45' thereof, while the conductor 43 is connected with a springy switch arm 46' of a switch 46. The other arm of the switch 46 is electrically connected with a conductor 47 which extends to the terminal 48 of the electric motor. The other terminal 49 of the motor is connected with a conductor 50 which is electrically connected with a double-switch assembly 51, 52. A conductor 53 extends from a springy switch arm 51' of the switch portion 51 of the switch 51, 52 into electrical connection with the conductor 43, and a conductor 54 is electrically connected with a springy switch arm 52' of the switch portion 52 of the double switch 51, 52, this conductor 54 in turn being electrically connected with the other springy switch arm 45" of the switch 45.

A switch-actuating means 55 in the form of an elongated plunger engages the springy switch arm 45' and is acted upon by a compression spring 56 which urges the switch-actuating means 55 into an opening 57 formed in the elongated wall portion 10 of the film-guide means 4 of the magazine. (See also FIGS. 1 and 3.) In this way the spring 56 urges the switch-actuating means 55 into engagement with the film 6. The plunger 55 and the opening 57 are aligned with an unperforated portion of the film situated between its row of perforations and the outer side edge of the film adjacent to the row of perforations thereof.

Figure 5:
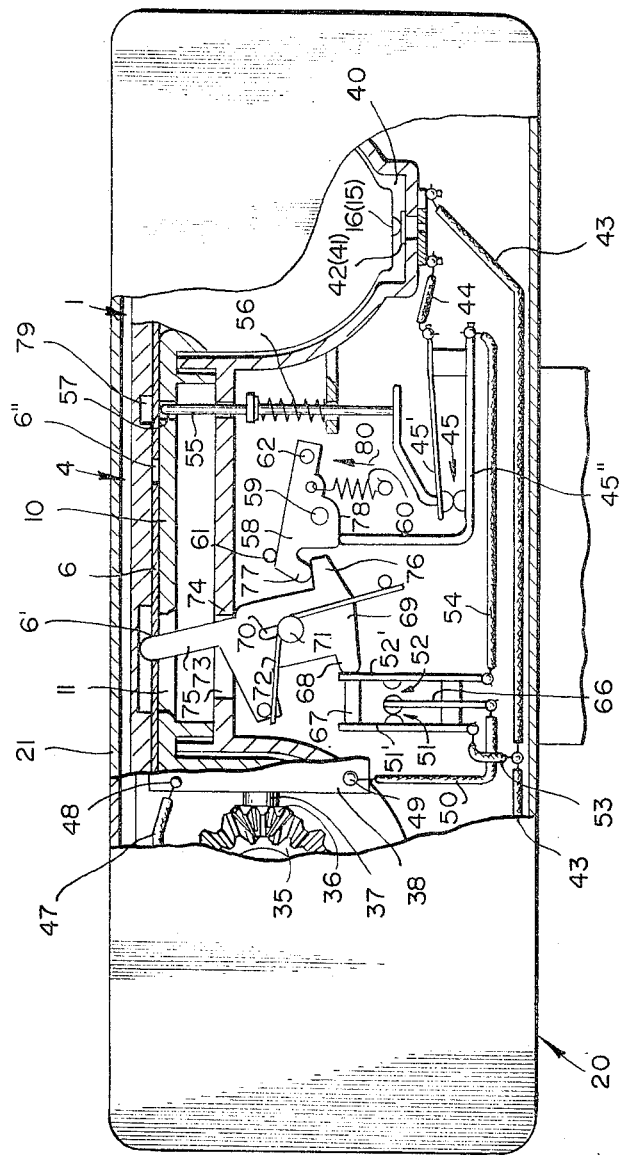
FIG. 5 shows the parts of FIG. 4 in the position which they take when the first film frame has reached the exposure position.
Figure 6:
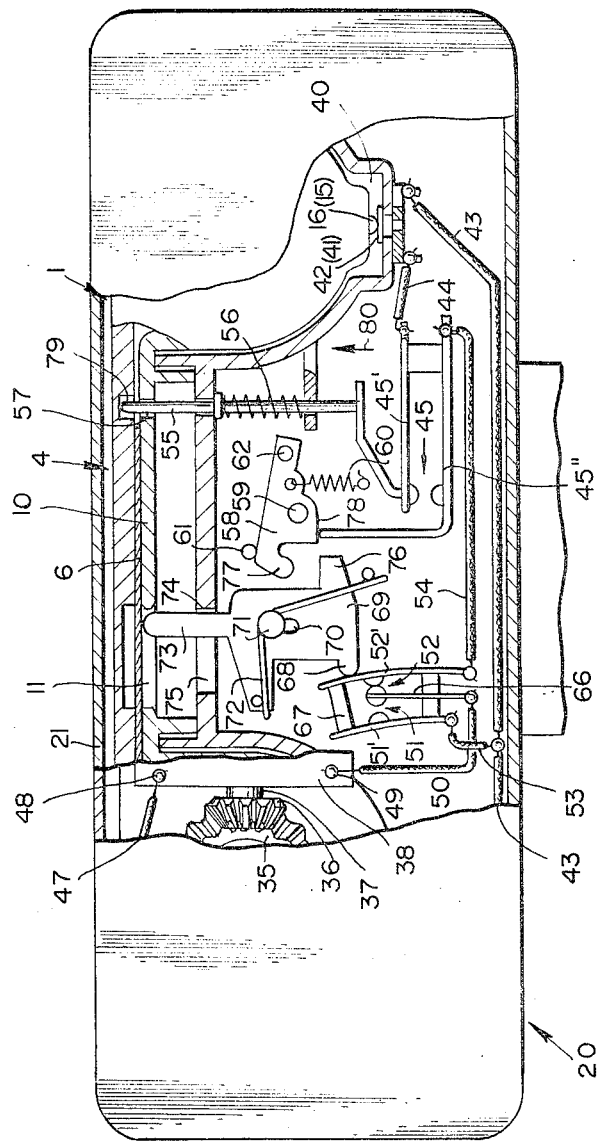
FIG. 6 shows the position which the parts of FIG. 4 take after all of the frames have been exposed and the exposed film is wound onto the take-up spool.

The other springy contact arm 45" of the switch 45 is in operative engagement with a switch lever 58 supported for rotary movement by a stationary pivot 59 of the camera and acted upon by a tension spring 60 which pulls on the lever 58 to maintain it in engagement with a stationary stop 61 carried by the camera, as shown in FIGS. 4–6. The switch lever 58 carries a control pin 62 capable of being acted upon by inclined surface 63 of a shutter-release member 64 (FIG. 3), this structure forming a shutter-actuating means. When the member 64 is displaced downwardly by the operator, as shown by the arrow 65 in FIG. 3, in order to trip the shutter to make an exposure, the inclined surface 63 at the bottom end of the shutter-tripping member 64 will engage the control pin 62 to displace the latter horizontally and thus turn the switch lever 58 in a counter-clockwise direction, as viewed in FIG. 4, in opposition to the spring 60.

The double-switch 51, 52 has an intermediate springy contact arm 66 which is connected to the conductor 50 and which is alternately in electrical connection with the springy switch arms 51' and 52'. The springy switch arms 51' and 52' are interconnected by way of an insulating bridge member 67. The inherent resiliency of the arms 51' and 52' tends to maintain the latter in the position shown in FIG. 5 where they are parallel with the intermediate arm 66 and where the switch 51 is closed. At this time the switch 52 is open.

A switch-actuating means 69 is situated in the camera and takes the form of a lever which has a switch arm 68 engaging the springy arm 52' for bringing about, in accordance with the particular position taken by the switch-actuating means 69, closing of the switch 52 and simultaneous opening of the switch 51, as is apparent from the positions of the switch 51, 52 illustrated in FIGS. 4 and 6. A pin-and-slot means is provided to support the switch-actuating means 69 for turning and shifting movement, and this pin-and-slot means includes an elongated slot 70 which is formed in the member 69 and through which a stationary pin 71 extends, so that the actuating means 69 is turnable about the pin 71 while at the same time being shiftable therealong. A bar or wire spring 72 acts on the switch-actuating means 69 to tend to displace the latter to the position thereof which is illustrated in FIGS. 4 and 6. In this latter position of the switch-actuation means 69, a film arm 73 thereof engages a side edge 74 of a window 75 of the camera housing 20. This film arm 73 extends through the window 75 and through the opening 11 of the magazine 1 to engage an elongated portion of the film 6 along which the row of perforations thereof are situated, and the spring 72 also seeks to urge the film arm 73 into engagement with the film at the row of perforations thereof.

As may be seen from FIG. 4, the circuit of the electric motor 38 includes a switch 46 located in the camera at such a position that the springy arm 46' will be engaged by a lug 21' of the swingable rear wall 21 which forms the closure means of the camera. When this rear wall 21 is in its closed position, the lug 21' thereof displaces the springy arm 46' to the position shown in FIG. 4 where the switch 46 is closed. When the rear wall 21 of the camera is swung to its open position, the springy switch arm 46' will, due to its own resiliency, move to the left, as viewed in FIG. 4, into engagement with the inner surface 20' of the camera, so as to open the switch 46 and thus prevent energizing of the motor 38 at this time.

This above-described structure operates in the following manner:

When the camera rear wall 21 is in its open position and there is no magazine 1 in the camera, the switch 46 is open. Furthermore, at this time the switch-actuating means 55 takes the position shown in FIG. 6, in response to the action of the spring 56, and in this position it will be noted that the springy contact asm 45', due to its own inherent resiliency, assumes an open position displaced from the arm 45" so that the switch 45 is open. Furthermore, the switch-actuating means 69 is maintained at this time by the spring 72 in a position where the film arm 73 engages the edge 74 of the opening 75, and at the same time the entire switch-actuating means 69 is displaced rearwardly to a location where the front end of the slot 70 engages the pin 71. Thus, in this latter position, the switch-actuating means 69 is displaced rearwardly from the location thereof which is illustrated in FIGS. 4 and 6. However, in this latter position of the switch-actuating means 69, its switch arm 68 is still at a location where it engages the springy switch arm 52' and maintains the switch 52 in its closed position. Thus, the electrical connection provided by the circuit from the contact members 41, 42 of the camera and the motor terminals 48, 49 is interrupted at two locations, namely at the open switches 45 and 46.

When a magazine 1 is introduced into the camera 20, in the manner illustrated in FIG. 2, the film-winding key 25 will become operatively coupled with the film take-up spool 7 in the manner described above. Toward the end of moving the magazine into the camera, the switch-actuating means 55 and the film arm 73 of the switch-actuating means 69, by extending through the openings 57 and 11, are engaged by the film 6, and in particular by the leading portion of the film strip, and thus both of the switch-actuating means 55 and 69 are displaced forwardly, in opposition to the springs 56 and 72, respectively, until the parts have the position shown in FIG. 4. In this way the switch 45, which was open until the magazine was introduced into the camera, becomes closed. At the end of the introduction of the magazine into the camera, the magazine contacts 15 and 16 come into engagement with the camera contacts 41 and 42, respectively. An electrical connection is thus provided at this time from the contact member 42 to the terminal 49 of the electric motor through the closed switch 45 and the closed switch 52, as well as through the conductors 44, 54 and 50, but the electrical connection between the contact member 41 and the terminal 48 is still interrupted by the open switch 46. Only when the closure means 21 of the camera is displaced to its closed position will the switch 46 be closed, so that now the electrical circuit between the battery 12 and the electric motor 38 is closed, and the electric motor 38 will now run and will rotate the take-up spool 7. In this way the initial, perforationless leader portion of the film strip is wound onto the spool 7, and the parts operate in this way when they have the position shown in FIG. 4.

As was indicated above, the film 6 has a row of perforations the number of which corresponds to the number of frames which are to be exposed, so that when the first frame which is to be exposed reaches the window 9, the first perforations 6' simultaneously reaches the region of the film arm 73 of the switch-actuating means 69. This film arm 73 will be received in and will pass through the first performation 6' under the influence of the spring 72, and the switch-actuating means 69 will therefore be turned about the pin 71 in a counter-clockwise direction, as viewed in FIG. 5, by the moving film itself. Thus, the switch-actuating means 69 is turned in a counter-clockwise direction about the pivot 71, and this turning of the switch-actuating means 69 displaces the switch arm 68 thereof away from the intermediate arm 66 which is common to the double-switch 51, 52 so that the springy arms 51' and 52' are free to assume their positions parallel to the intermediate arm 66, as shown in FIG. 5. As a result the switch portion 52 of the double-switch 51, 52 opens while simultaneously the switch portion 51 thereof closes. The opening of the switch portion 52 interrupts the electrical connection between the battery 12 and the electric motor so that the latter stops. The simultaneous closing of the switch portion 51 provides for short-circuiting of the electric motor by way of the conductor 50, the arm 66, the arm 51', the conductor 53, the conductor 43, the switch 46, and the conductor 47, so that the motor very suddenly comes to rest, thus providing a precise determination of the location of the frame which is to be exposed. Furthermore, the movement of the film strips is blocked in a purely mechanical manner because the switch-actuating means 69, whose film arm 73 extends through the perforation 6', moves, at its shutter arm 76, into engagement with an arm 77 of the switch lever 58 which at this time engages the stop 61, so that the switch lever 58 acts as an intermediate stop member between the shutter arm 76 and the stop 61 at this time, thus mechanically preventing further turning of the switch-actuating means 69. In this way the parts take the position shown in FIG. 5 where the first frame which is to be exposed is precisely positioned at the window 9.

When the shutter-actuating means described above and shown in FIG. 3 is actuated to trip the shutter so as to make the exposure, the shutter-tripping plunger 64 is displaced downwardly in the direction of the arrows 65 and its lower inclined surface 63 acts on the control pin 62 in the direction of the arrow 80 shown in FIG. 5, so as to turn the lever 58 in a counter-clockwise direction, as viewed in FIG. 5, about the pin 51. The arm 77 of the lever 58, by its engagement with the shutter arm 76 of the switch-actuating means 69, will initially act on the switch-actuating means 69 to displace the latter forwardly within the limits possible in accordance with the length of the slot 70, until the film arm 73 is displaced forwardly beyond the perforation 6'. Now the spring 72 is capable of turning the switch-actuating means 69 in a clockwise direction about the pin 71 until the film arm 73 engages the edge 74 of the window 75, and thus the parts take the position shown in FIGS. 4 and 6. Thus, the switch arm 68 of the switch-actuating means 69 closes the switch portion 52, while simultaneously opening the switch portion 51 to interrupt the short-circuiting of the electric motor.

However, it is to be noted that at this time the electric motor still will not be energized. The reason for this is that at this time the electrical connection between the battery 12 and the electric motor is interrupted by the open switch 45. The turning of the switch lever 58 in opposition to the spring 60 forwardly beyond the stop 61 results in displacing of the springy arm 45" forwardly to a location out of engagement with the springy arm 45', and the switch 45 will thus be maintained open as long as the plunger 64 is depressed by the operator. Thus, at this time the edge 78 of the lever 58 acts on the switch arm 45" to maintain the switch 45 open. Only when, after tripping of the shutter, the shutter-release plunger 64 has again returned to its rest position so that the switch lever 58 can again assume the position shown in the drawings, will the edge 78 of the lever 58 permit the springy arm 45" to resume its position shown in the drawings closing the switch 45 by engaging the switch arm 45', as indicated in FIGS. 4 and 5. Now the circuit between the battery 12 and the electric motor is closed, and a further transportation of the film takes place until the next perforation 6" of the row of perforations receives the film arm 73 of the switch-actuating means 69, to repeat the above operations.

After the last frame has been exposed, the switch 45 wil lagain be closed, in the manner described above, and thus the motor is energized so as to advance the film 6. The trailing portion of the film strip, situated beyond the exposed frames thereof, is formed with no row of perforations, so that a stopping of the motor by opening of the switch portion 52 of the double switch will not take place. An interruption in the circuit between the battery 12 and the motor 38 is provided, however, by way of the opening of the switch 45. The switch-actuating means 55 which engages the springy arm 45' of the switch 45 is maintained, in opposition to the spring 56, in the position shown in FIGS. 4 and 5 by way of a perforationless portion of the film strip 6 situated between its row of perforations and the outer side edge thereof adjacent to the row of perforations. Thus, during movement of the film from one frame to the next as well as when the film is stationary between these movements the switch-actuating means 55 is maintained by the film itself in opposition to the spring 56 in the position shown in FIGS. 4 and 5. The magazine is formed, at its rear wall and in alignment with the opening 57, with a recess 79 which is directed forwardly toward the opening 57, so that the perforationless portion of the film strip which engages the plunger 55 in the position of the parts shown in FIGS. 4 and 5 moves between the opening 57 and the recess 79. However, when the trailing portion of the film strip 6 is advanced beyond the switch-actuating means 55, the spring 56 is capable of expanding to the position shown in FIG. 6 where the plunger 55 is advanced all the way into the recess 79. The springy arm 45' will, due to its own resiliency, follow this movement of the switch-actuating means 55, so that the switch 45 automatically opens.

When the rear wall 21 of the camera is displaced to its open position, the film magazine can be removed from the camera 20, and of course in the above-described manner the trailing portion of the film, situated beyond the exposed frames thereof, will have been wound onto the spool 7, so that there is no danger of exposure of the film when the magazine is removed from the camera.

The primary advantage which is achieved with the above-described magazine and camera of the invention resides in the fact that the operator need not carry out any special manipulations in connection with advancing of the film and in addition need not be concerned, as indeed he is with conventional cameras having electric driving motors, with whether or not a source of current is present and with the particular condition of the source of current which otherwise would have to be carried by the camera housing, since every time a magazine of the invention is inserted into the camera there is at the same time, and without requiring any special additional manipulations, an introduction of a battery into the camera, this battery storing sufficient energy for the advancing of the film and other camera operations, as referred to above.

The particular manner in which the battery is assembled with the magazine is of no special significance in connection with the use of the magazine and camera of the present invention. Thus, for example, the battery can be introduced into the magazine simultaneously with the introduction of the unexposed film into the latter, and then the magazine can be closed by the manufacturer, or the magazine may be provided with a suitable opening for introduction of the battery after the unexposed film has already been placed in the magazine.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. For use in a camera, a film magazine having a film supply chamber, a film take-up chamber, and film-guide means extending between and interconnecting said chambers for guiding the film from said film supply chamber to said film take-up chamber, said film-guide means being formed with a window through which film in the magazine is exposed, and said magazine having an exterior surface, a source of electrical current carried by said magazine and having poles, and electrical contact members carried by said magazine at said exterior surface thereof and electrically connected with said poles, respectively, said magazine having an elongated wall portion forming part of said film-guide means and defining part of said window, said elongated wall portion being formed with a pair of openings passing therethrough, one of said openings being aligned with a row of perforations of film in the magazine and the other of said openings being aligned with a portion of the film situated between said perforations thereof and an outer side edge of the film.

2. The combination of claim 1 and wherein said magazine has a rear wall formed with a recess aligned with and directed toward said other opening, the portion of the film which is situated between said row of perforations and said side edge thereof extending between said recess and said other opening.

3. For use in a camera, a film magazine having a film supply chamber, a film take-up chamber, and film-guide means extending between and interconnecting said chambers for guiding the film from said film supply chamber to said film take-up chamber, said film-guide means being formed with a window through which film in the magazine is exposed, and said magazine having an exterior surface, a source of electrical current carried by said magazine and having poles, and electrical contact members carried by said magazine at said exterior surface thereof and electrically connected with said pole, respectively, a film-transport means coacting with the film in the magazine to advance film therein when the magazine is in a camera, an electric motor carried by the camera and operatively connected to said film-transport means for driving the latter, an electrical circuit electrically connected with said motor and having camera contact members which respectively engage the contact members of said magazine when the latter is in the camera for electrically connecting said source of electrical energy through said circuit to said motor, said circuit including a switch having a closed position for energizing said motor and an open position for stopping the operation of said motor, switch-actuating means carried by the camera and coacting with said switch for controlling the movement thereof between said open and closed positions thereof, said switch-actuating means coacting with a row of perforations of film in the magazine for controlling the movement of said switch from said closed to said open position thereof when an unexposed film frame has reached a position at said window where it is ready for exposure, and shutter-actuating means carried by the camera for actuating the shutter thereof, said shutter-actuating means coacting with said switch-actuating means for displacing the latter to a position controlling the movement of said switch from said open to said closed position thereof when an exposure has been made, so that after each exposure the film will be advanced until the next unexposed frame is in a position for an exposure.

4. The combination of claim 3 and wherein a pin-and-slot means coacts with said switch-actuating means to guide the latter for turning and shifting movement.

5. The combination of claim 4 and wherein said switch-actuating means has a film arm coacting with the film for movement into and out of a perforation thereof, a switch arm engaging said switch for controlling the movement thereof between said open and closed positions, and a shutter arm responding to movement of said shutter-actuating means.

6. The combination of claim 3 and wherein said camera has a closure means movable between open and closed positions for providing for insertion of a magazine into and withdrawal of a magazine from the camera when said closure means is in said open position thereof and for retaining a magazine in the camera when said closure means is in said closed position thereof, and said circuit including a second switch acted upon by said closure means to be placed in a closed position only when said closure means is in said closed position thereof, so that said circuit is open and said motor is maintained unenergized whenever said closure means is in said open position thereof.

7. The combination of claim 6 and wherein said closure means includes a hinged camera rear wall swingable between open and closed positions, and said second switch being closed by said rear wall when the latter is in its closed position and said second switch being in its open position when said camera rear wall is swung to its open position.

8. The combination of claim 3 and wherein an additional switch is located in said circuit for preventing operation of the motor when said additional switch is in an open position while closing that part of the circuit where said additional switch is located when said additional switch is in a closed position, and second switch-actuating means coacting with said additional switch and with an unperforated portion of film in the magazine for maintaining said additional switch closed as long as said second switch-actuating means engages the unperforated portion of the film and for controlling the movement of said additional switch to its open position when said second switch-actuating means no longer engages an unperforated portion of the film.

9. The combination of claim 3 and wherein an additional switch is located in said circuit and coacts with said shutter-actuating means for maintaining said circuit open, and thus preventing operation of the motor, as long as said shutter-actuating means is operated.

10. The combination of claim 8 and wherein one of said switches includes an elongated springy switch arm coacting with said shutter-actuating means to be placed in a position opening said one switch as long as said shutter-actuating means is operated, so that the motor cannot operate during operation of the shutter-actuating means.

11. The combination of claim 9 and wherein a switch lever is turned by said shutter-actuating means and coacts with said first-mentioned switch-actuating means and with said additional switch for transmitting movement from said shutter-actuating means to said first-mentioned switch-actuating means and said additional switch.

12. The combination of claim 11 and wherein a stop engages said lever for limiting the turning thereof, and said stop acting through said lever on said first-mentioned switch-actuating means for also limiting the movement of the latter.

13. The combination of claim 3 and wherein said switch has a double set of contacts short-circuiting said motor when said switch is in its open position while closing the circuit for the motor through said source of electrical energy when said switch is in its closed position.

References Cited

UNITED STATES PATENTS

| | | |
|---|---|---|
| 2,989,906 | 6/1961 | Rentschler. |
| 3,135,182 | 6/1964 | Hintze et al. |
| 3,171,338 | 3/1965 | Winkler et al. |
| 3,260,182 | 7/1966 | Nerwin _____ 95—31 |

FOREIGN PATENTS

| | | |
|---|---|---|
| 199,491 | 9/1958 | Austria. |

NORTON ANSHER, Primary Examiner

D. S. STALLARD, Assistant Examiner